Sept. 11, 1951  P. D. BECKER  2,567,865
FURNITURE GLIDE
Filed May 13, 1949
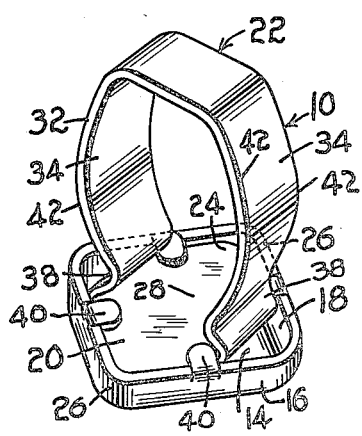
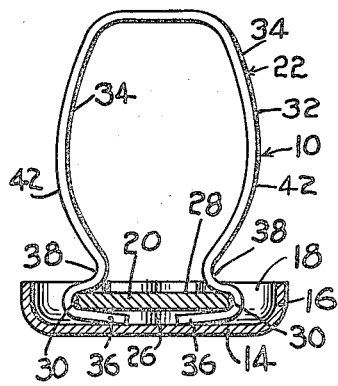
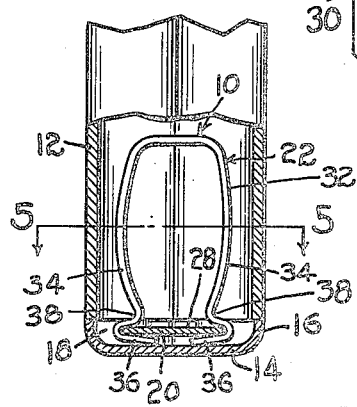
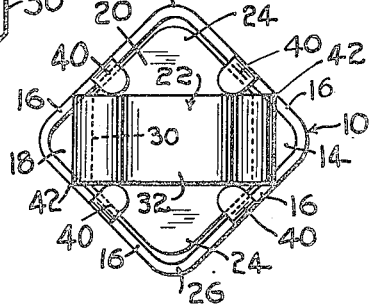
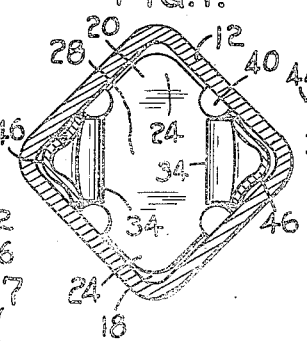
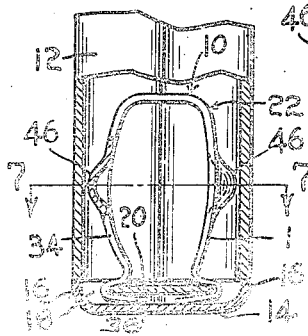
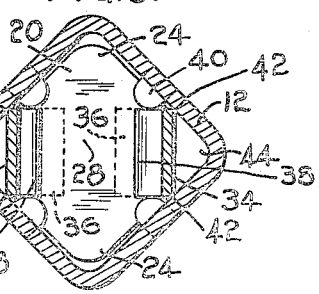
INVENTOR:
PHILIP D. BECKER,
BY John Todd
ATTORNEY Patented Sept. 11, 1951

2,567,865

UNITED STATES PATENT OFFICE 2,567,865

FURNITURE GLIDE

Philip D. Becker, Hingham, Mass., assignor to United-Carr Fastener Corporation, Cambridge, Mass., a corporation of Massachusetts Application May 13, 1949, Serial No. 93,089

2 Claims. (Cl. 16—42)

This invention relates to closure members for closing the ends of pipes and the like, and has particular reference to a member which is adapted for insertion into the end of a square hollow tube such as is used in the manufacture of metal furniture.

The object of the invention is to provide a closure member for square hollow tubes and the like which is adapted for secure non-rotative assembly in such tubes.

A further object of the invention is to provide a closure member for square hollow tubes which comprises a pair of sheet metal spring arms which are adapted to engage the inner surface of the tube near diagonally opposite corners.

A still further object of the invention is to provide a closure member for insertion into the ends of square tubes and the like, in which a sheet metal spring constructed to engage the inner surface of the tube is provided with an outwardly projecting portion adapted to fit into diagonally opposite corners to align the member in the tube.

Other objects of the invention will, in part, be obvious, and will, in part, appear hereinafter. For a fuller understanding of the nature and objects of the invention, reference should be had to the following detailed description, taken in conjunction with the accompanying drawing, in which:

Fig. 1 is a perspective view of a closure member embodying the features of the invention;

Fig. 2 is a view in elevation, partly in section of the closure member of Fig. 1;

Fig. 3 is a plan view of the closure member of Fig. 1;

Fig. 4 is a view in elevation, partly in section, illustrating the closure member of Fig. 1 assembled in the end of a square tube;

Fig. 5 is a view in section taken on line 5—5 of Fig. 4;

Fig. 6 is a view of a closure member embodying certain modifications within the scope of the invention;

Fig. 7 is a view in section taken on line 7—7 of Fig. 6;

Fig. 8 is a plan view of a retaining plate for use in the closure member of the invention.

Referring to the drawing, there is illustrated a closure member 10, which is adapted for insertion into the end of a square hollow tube 12. The member 10 comprises a square base 14, having turned up edge portions 16 forming a square recess 18, a retaining plate 20 disposed in the recess, and a tube engaging member 22 assembled on the retaining plate. The retaining plate 20 is disposed diagonally across the recess 18, and is provided with a pair of ends 24 which are shaped to fit into diagonally opposite vertical corners 26 of the recess, and a supporting portion 28 intermediate the ends which has edges 30 which are parallel to the diagonal of the base. In the preferred form, the tube engaging member 22 comprises a U-shaped sheet metal spring 32 having the bottom of the U extending upwardly from the base. The spring 32 is assembled on the supporting portion 28 of the retaining plate so that the plane of the U is disposed on a diagonal of the square recess for a purpose to be hereinafter described. This assembly is accomplished by providing legs 34 of the U with inwardly turned end portions 36 which are disposed under the supporting portion 28, and inwardly extending shoulder portions 38 disposed on the legs immediately above the support portion. Retaining tabs 40 are provided on the base and are adapted to be turned inwardly to engage the retaining plate 20 to retain the parts in assembly.

The legs 34 of the spring are bowed outwardly for frictional engagement with the inner surface of the tube 12 when the closure member is assembled therein, as illustrated in Figs. 4 and 5. As illustrated therein, the closure member is inserted into the square tube so that edges 42 of the legs 34 engage the tube at or near diagonally opposite corners 44, with the width of the leg extending across the adjacent corner. The dimensions of the spring are such in relation to the size of the pipe as to cause inward compression of the arms when the spring is inserted therein to cause the arms to firmly engage the pipe, and since the arms are joined at the upper end and supported at the lower end against inward flexing by the support portion of the retaining plate, the spring has an exceptionally stiff action to enable it to engage firmly the tube.

Referring to Fig. 6, there is illustrated a closure member in which the legs 34 are provided with an outwardly extending portion 46 which is shaped and arranged to extend into an adjacent corner of the tube when the closure member is assembled therein. The extending portion assists in aligning the member in the tube during insertion, and prevents rotation of the member in the tube after assembly. In the preferred form, the projection portion 46 is formed by embossing the appropriate portion of the leg outwardly to form a rounded projection which conforms approximately to the shape of the corner of the tube. However, other forms of projections may be equally satisfactory in some cases, and may consist simply of a tab punched out of the center of the leg to extend into the corner, or a pair of tabs extending outwardly from opposite edges of the arm to meet at aproximately a right angle in the adjacent corner.

Although in the preferred form of the device, the spring member is U-shaped as illustrated, it will be understood that the tube-engaging member may, in some cases, consist of two individual legs disposed on the base in the same relation to each other as the legs of the U-shaped spring.

Since certain other modifications may be made in the device without departing from the scope of the invention, all matter contained herein should be interpreted in an illustrative, and not in a limiting sense.

I claim:

1. A closure member adapted for insertion into the end of a tubular member of square cross section comprising a substantially square base having an upturned flange disposed around the periphery of said base providing surfaces for engaging the end edges of a substantially square tubular member and a substantially square recess in said base, a retaining plate member fitting within said recess with a pair of opposite side edges disposed adjacent to but spaced from diagonally opposite corners of said recess, integral tongues extending from the end edges of said upturned flange at substantially the centers of the sides of said square and overlying said retaining plate for retaining it in said recess, and a tube-engaging member comprising a U-shaped sheet metal spring member having the bight of the U extending upwardly from the base, the plane of the U being disposed on a diagonal of said base, and the arms of the U being shaped and arranged to cause the side edges thereof to engage the inner surface of a square tubular member near diagonally opposite corners with the width of the arms extending across the corner, the free ends of said arms having means engaging said retaining plate on opposite sides along said pair of opposite side edges.

2. A closure member in accordance with claim 1 in which at least one of the arms of the U-shaped member has an outwardly extending portion shaped and arranged to extend beyond the arm into the adjacent corner of the square tubular member to align the member in relation to the tube during insertion.

PHILIP D. BECKER.

REFERENCES CITED

The following references are of record in the file of this patent:

UNITED STATES PATENTS

| Number | Name | Date |
| --- | --- | --- |
| 2,238,705 | Miller | Apr. 15, 1941 |
| 2,259,714 | Woodward | Oct. 21, 1941 |